(12) United States Patent
Schumann et al.

(10) Patent No.: US 8,685,357 B2
(45) Date of Patent: Apr. 1, 2014

(54) FIRING SUPPORT FOR CERAMICS AND METHOD FOR OBTAINING SAME

(75) Inventors: Matthias Schumann, Cavaillon (FR); Matteo Scalabrino, Roedental (DE); Kerstin Quellmalz, Wildenfels (DE)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 411 days.

(21) Appl. No.: 11/996,625

(22) PCT Filed: Jul. 19, 2006

(86) PCT No.: PCT/FR2006/050729
§ 371 (c)(1), (2), (4) Date: Jul. 24, 2008

(87) PCT Pub. No.: WO2007/012775
PCT Pub. Date: Feb. 1, 2007

(65) Prior Publication Data
US 2009/0081106 A1  Mar. 26, 2009

(30) Foreign Application Priority Data

Jul. 28, 2005  (FR) .................................... 05 52356

(51) Int. Cl.
*C01B 31/36* (2006.01)
*B32B 9/04* (2006.01)

(52) U.S. Cl.
USPC ........ 423/345; 428/408; 428/332; 428/319.1; 427/377

(58) Field of Classification Search
USPC .......... 423/345; 428/408, 332, 319.1; 427/377
See application file for complete search history.

(56) References Cited

U.S. PATENT DOCUMENTS

| 3,925,577 A | 12/1975 | Fatzer et al. |
| 4,513,030 A * | 4/1985 | Milewski ...................... 427/452 |
| 5,425,860 A * | 6/1995 | Truher et al. ............ 204/192.23 |
| 5,536,574 A | 7/1996 | Carter |
| 5,545,484 A | 8/1996 | Yamaguchi et al. |

FOREIGN PATENT DOCUMENTS

JP   02074671 A  *  3/1990 ............ D06M 11/78

OTHER PUBLICATIONS

Translated JP 02074671.*
Translated JP 02074671, 1990.*

* cited by examiner

*Primary Examiner* — Rebecca Lee
(74) *Attorney, Agent, or Firm* — Oblon, Spivak, McClelland, Maier & Neustadt, L.L.P.

(57) ABSTRACT

The invention relates to a firing support for ceramics formed from a carbon substrate at least partially covered by a coating based on silicon carbide (SiC), said coating additionally adhering to said substrate. The invention also relates to a process for obtaining such a support.

7 Claims, 1 Drawing Sheet

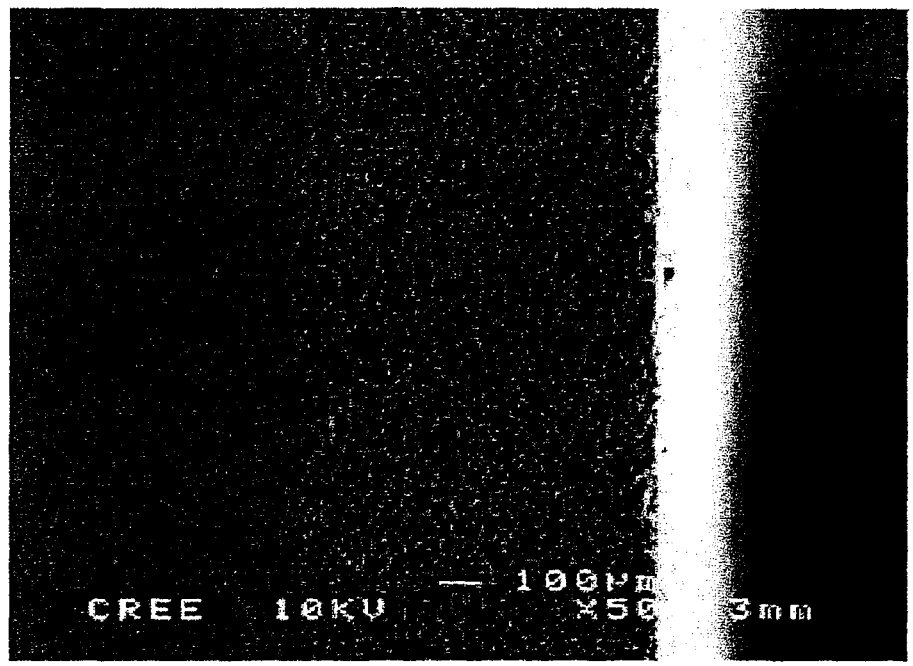

FIRING SUPPORT FOR CERAMICS AND METHOD FOR OBTAINING SAME

The present invention relates to a support for firing ceramic parts, especially ones made of silicon carbide. It relates more particularly to a carbon support coated with silicon carbide and also to the process for obtaining such a support.

During sintering, ceramic parts must generally undergo steps of firing at very high temperature, especially above 1500° C., or even above 2000° C. Supports suitable for these high temperatures are used and chosen from the most refractory materials. A high thermal shock resistance is also an essential property for the application of a material as a firing support. Carbon, in particular in its graphite form, is thus employed due to its extremely high melting point, which is above 3000° C. The self-lubricating properties of graphite, due to the weakness of the bonds between the carbon atoms of two successive layers are also appreciated in this type of application as they generally make it possible to avoid or at least limit bonding with the material to be sintered.

High-temperature bonding phenomena between graphite and certain ceramic materials such as silicon carbide (SiC) have however been observed, in particular for firing temperatures exceeding 1800° C., resulting in a decrease of the yield, the debonding, besides the time used for this maneuver, being capable of damaging the ceramic part and/or the graphite support.

The object of the invention is to overcome these drawbacks by providing a novel type of firing support for ceramics.

One subject of the invention is a firing support for ceramics formed from a carbon substrate at least partially covered by a coating based on silicon carbide (SiC) mainly crystallized in the alpha form ($\alpha$—SiC), said coating additionally adhering to said substrate.

This is because the inventors have found that the contact between the ceramic parts to be fired, in particular those made of silicon carbide, and a support having a surface that is itself made of silicon carbide does not generate any bonding, even at temperatures as high as 1800° C. This result is particularly surprising, as it was instead expected that the chemical similarity between the support and the part to be fired would result, during the firing, in a sintering that would lead to an irremediable bonding between these two components. The silicon carbide of the coating of the support according to the invention is crystallized in the alpha form, this form having the strongest chemical resistance.

The term "coating" should be understood in the sense of the present invention to mean a layer deposited on the substrate and therefore forming an overthickness with respect to said substrate.

In order to avoid any bonding, the coating based on silicon carbide advantageously contains at least 90% by weight of silicon carbide. Preferably, it is even composed of silicon carbide that is pure or almost pure except for unavoidable impurities. The SiC layer may however contain other carbides, such as for example boron carbide $B_4C$, in amounts that do not exceed 10%, or even 5%. The SiC layer preferably does not contain alumina ($Al_2O_3$) or zirconia ($ZrO_2$), on the one hand due to the discrepancy between their expansion coefficient (of the order of 7.5 to $8.5 \times 10^{-6}$/° C.) and that of carbon or of SiC (of the order of 4 to $5 \times 10^{-6}$/° C.) which generates thermomechanical stresses between the substrate and the coating and therefore a weak adhesion and, on the other hand, due to the fact that these oxides react chemically with the silicon carbide. Zirconia may, for example, be reduced by the silicon carbide, creating cracks in the coating. Alumina is itself capable of reacting with the silicon carbide, resulting in the formation of secondary phases that are unstable at high temperature.

The coating based on silicon carbide preferably has a porosity between 10 and 65%, preferably between 30 and 50%. This is because the inventors have observed that this porosity range makes it possible to obtain a high thermal shock resistance, which is particularly appreciable for the application as a firing support, while not lessening the performance in terms of bonding with the ceramic part to be fired.

The coating according to the invention preferably has a microstructure in which silicon carbide particles are joined together by bridges that are themselves made of silicon carbide.

The thickness of the coating based on silicon carbide is preferably greater than or equal to 500 microns, especially greater than or equal to 1 millimeter, in order to give the coating a good dimensional stability.

The carbon substrate is advantageously in the form of graphite, especially of the isotropic type.

Another subject of the invention is a process for manufacturing such a support, and in particular a process for depositing a coating based on SiC onto a carbon substrate, preferably in the graphite form, comprising at least one step of depositing particles of silicon carbide (SiC) as the main precursor of silicon followed by at least one step of firing at a temperature between 2100° C. and 2450° C. under a nonoxidizing atmosphere.

This process makes it possible to obtain a coating based on silicon carbide, of which the porosity is between 10 and 65%, especially between 30 and 50%, which adheres particularly well to the carbon substrate and has good chemical resistance and abrasion resistance properties.

The expression "silicon precursor" should be understood in the sense of the present invention to mean any substance (metal, oxide, carbide, halide, nitride, organometallic compound, etc.) that allows silicon atoms to be incorporated into the coating. Silicon precursors may be, for example, the metal Si, the oxide $SiO_2$, the carbide SiC or the halide $SiCl_4$. The expression "main" precursor should be understood to mean that among the precursors used to incorporate silicon atoms into the coating, silicon carbide is that present in the largest amount by weight.

In order to improve the abrasion resistance properties of moving parts, it is known to deposit thin films of silicon carbide onto graphite parts of complex shape, such as tubes, by the CVD (Chemical Vapor Deposition) process from gaseous silicon precursors such as $SiCl_4$. This process does not however make it possible to obtain a satisfactory adhesion between the carbon substrate and the silicon carbide.

The thermal shock resistance of the parts coated with silicon carbide by CVD is moreover too low, in any case insufficient for an application as a firing support for ceramics. The inventors have demonstrated the fact that this low thermal shock resistance could be attributed to the high density (low porosity) of coatings formed by CVD.

There are also processes known as "CVR" (Chemical Vapor Reaction) processes in which metallic silicon (Si), used as a silicon precursor, is deposited in the form of a slip or by CVD onto a graphite substrate then fired at around 1600° C. The silicon that is liquefied penetrates into the pores of the graphite, a surface layer of the graphite part being enriched with silicon carbide, and consequently having a higher abrasion resistance than that of graphite. The material obtained by this type of processes is a composite in which the upper layer of the graphite is converted to graphite containing silicon carbide particles. It is not therefore a carbon material having a coating based on silicon carbide, in the sense that the word "coating" is understood within the scope of the present invention.

This type of process has already been used to create an upper layer of graphite that has good adhesion with the silicon carbide subsequently deposited by CVD and thus to solve the aforementioned technical problem of low adhesion between the carbon and the silicon carbide deposited by CVD. U.S. Pat. Nos. 5,545,484 and 3,925,577 describe, for example, a two-step process: during the first step, a silicon layer is deposited on a graphite support then heated so that the silicon penetrates into the pores of the surface part of the graphite and forms silicon carbide in these pores; in a second step, silicon carbide is deposited above this surface part by CVD. In this complex process, the first step is necessary to obtain a layer of silicon carbide that adheres sufficiently to the carbon substrate. Since the silicon carbide coating is deposited by CVD at temperatures of around 1400° C. to 1600° C., the silicon carbide obtained cannot be, even partially, crystallized in the alpha form.

A process called "pack cementation" is also known from U.S. Pat. No. 5,536,574 in which the surface part of the carbon substrate is converted to silicon carbide. This is therefore not a process of depositing a coating based on silicon carbide, as the silicon carbide obtained does not form an overthickness relative to the initial carbon substrate. This process uses close contact between the carbon substrate and a mixture of particles of silicon carbide, of alumina and of silicon and heating the assembly at temperatures between 1370 and 1650° C. The main silicon precursor here is silicon carbide but, considering the temperatures involved, the silicon carbide formed cannot be in alpha form.

The process according to the invention is therefore differentiated from known processes in that it is simpler and in that it makes it possible to obtain an adherent coating based on silicon carbide crystallized in the alpha form, of which the porosity is between 10 and 65%, the main silicon precursor being itself silicon carbide. At temperatures greater than or equal to 2100° C., the silicon carbide particles recrystallize to form a layer based on SiC in alpha form ($\alpha$—SiC), which has a suitable porosity, is homogeneous and adheres to the subjacent graphite substrate. The coating obtained by this process has a microstructure in which the silicon carbide particles are joined together by bridges that are themselves made of silicon carbide.

The nonoxidizing (neutral or reducing) atmosphere is essential in order to avoid any oxidation of the silicon carbide. Firing is preferably carried out under a neutral atmosphere, especially under argon.

According to one preferred embodiment that results in an improvement of the adhesion between the coating and the substrate, the Si and/or $SiO_2$ compounds are moreover used as silicon precursors, the main precursor always being SiC.

It is particularly preferred that the only silicon precursors are the components below in the following proportions by weight, relative to the total weight of silicon precursors:

| | |
|---|---|
| SiC | 70 to 100%; |
| Si | 0 to 25%; |
| $SiO_2$ | 0 to 10%. |

This family of compositions has specifically an optimum adhesion between the coating based on silicon carbide and the carbon substrate.

A particularly suitable porosity is obtained when 40 to 80 wt % of the SiC particles have a diameter greater than or equal to 10 microns, the median diameter of this particle size fraction being less than 300 microns. Too high a proportion of fine particles moreover results in a drop in the mechanical strength, especially the appearance of cracks on firing.

The silicon precursors, in pulverulent form, may be deposited directly on to the carbon substrate in the form of powder beds. For ease of forming, they are however advantageously introduced by means of a slip or a slurry, the solvent then preferably being water. The amount of water is adjusted as a function of the viscosity of the slurry or of the slip. A slip containing between 10 and 20% of the total weight of silicon precursors is preferred for ease of use reasons.

The slip or the slurry advantageously and in addition contains one or more compounds chosen from deflocculants such as alkali metal silicates (especially sodium silicates), binders such as polyvinyl alcohol (PVA), plasticizers such as polyethylene glycol (PEG), the total weight content of these compounds not exceeding 5%, especially 2% of the total weight of silicon precursors.

Various processes for depositing the slip or the slurry on the carbon substrate can be envisaged, such as depositing with a scraper, with a trowel, with a brush or else by spraying.

The weight of slip deposited, adjusted as a function of the thickness of the desired coating, is preferably between 10 and 200 mg of solids per $cm^2$ of substrate. Amounts of 20 to 80 $mg/cm^2$ are preferred.

The process according to the invention preferably comprises a drying step prior to firing. This drying step advantageously makes it possible to reduce the amount of bound water to less than 1% of the weight of the coating. The drying preferably comprises two steps, one at ambient temperature and in air for a period ranging from 2 hours to 24 hours, the second in an oven at a temperature ranging from 100° C. to 200° C. for a period of 2 hours to 12 hours. Microwave drying or stoving is also possible.

The thickness of the coating is adjusted due to the amount of slip deposited, or alternatively using several deposition and firing cycles.

The firing step preferably comprises a temperature rise following a ramp of 5 to 50° C./minute, then a hold for a period which may range from 5 minutes to 5 hours at the maximum temperature, between 2100° C. and 2450° C.

Another subject of the invention is a firing support for ceramics capable of being obtained by the process according to the invention.

A final subject of the invention is the use of a firing support according to the invention for firing parts made of silicon carbide (SiC) at above 1800° C.

The invention will be better understood on reading the following exemplary embodiments, which illustrate the invention without however limiting it.

EXAMPLE 1

A firing support made of carbon of isotropic graphite type, having a density of 1.74 and having a porosity of 12% was coated with silicon carbide according to the process described below.

Preparation of the SiC-Based Slip

Particles of silicon carbide having a purity greater than 98% and having a particle size distribution such that 70 wt % of the particles had a diameter greater than 10 microns, the median diameter of this particle size fraction being less than 300 microns were kneaded for 15 minutes with distilled water, sodium silicate and fumed silica ($SiO_2$) having a median diameter less than 1 micron.

Added to the mixture obtained were a 15% aqueous solution of polyvinyl alcohol (PVA) and a 10% aqueous solution of polyethylene glycol (PEG). Kneading for around 10 minutes made it possible to obtain a homogeneous slip of which the pH was around 9 and the moisture content was 18%.

The slip contained, as silicon precursors, both 90 wt % silicon carbide (SiC) and 10 wt % silica ($SiO_2$), these percentages being relative to the total amount of silicon precursors in the coating. The amount of water added to these precursors was 15 wt %, the sodium silicate being added up to 0.8%, the PVA solution up to 0.5% and the PEG solution also up to 0.5%. All the percentages given are relative to the total amount by weight of silicon precursors.

Depositing and Firing the Slip

The slip was deposited on the graphite substrate using a scraper, in an amount of around 40 mg of solids per $cm^2$.

Drying for a period of 12 hours was carried out at ambient temperature and in air, followed by a drying step in an oven at 120° C. for around 6 hours.

The firing of the slip then took place in a furnace under an argon atmosphere at a temperature above 2100° C. The firing step comprised a step of increasing the temperature at a rate of 10° C./minute followed by a step of holding at the maximum temperature for 2 hours.

The coating obtained had a thickness of around 500 microns and perfect adhesion to the graphite substrate. The SiC was crystallized in the alpha form.

EXAMPLE 2

This exemplary embodiment only differed from the preceding one in the composition of the silicon precursors used for forming the coating, the SiC particles representing 75 wt % of the precursors, the other precursor being silicon (Si) powder, of which the median diameter was 4 microns and of which the purity was greater than 98.5%.

FIG. 1 illustrates the microstructure of the coating obtained. It is a scanning electron microscopy (SEM) photo showing on the far left hand side the graphite substrate (non-porous) and at the center the silicon carbide coating (porous) forming an overthickness on the substrate. The interface is itself very clean, which is evidence of a very low interdiffusion between the substrate and the coating.

EXAMPLE 3 (COMPARATIVE)

In this comparative example, no coating was formed on the graphite substrate.

Bonding Test

A sample of silicon carbide was deposited on the support according to the invention (examples 1 and 2) or on to the graphite support (example 3), the assembly then being brought to 1900° C. under an argon atmosphere.

After this firing step, observation of the bonding was both visual (observation of a possible reaction zone between the support and the fired part) and tactile (feeling of resistance when removing the part by hand).

In the case of example 3, a reaction zone was observed level with the zone of contact between the graphite support and the SiC part, and a resistance was perceived during the separation of these two components.

On the other hand, no start of bonding was observed in the case where the support used was a support according to examples 1 and 2.

The invention therefore has the advantage of obtaining a firing support that is perfectly stable and inert with respect to ceramic such as silicon carbide for firing temperatures of 1800° C. or more.

The preceding description allows some possible embodiments of the invention to be illustrated. It is clearly understood that this description is not however limiting and that a person skilled in the art is able to carry out other variants of the invention without however departing from its scope.

The invention claimed is:

1. A firing support for ceramics, comprising:
   a carbon substrate; and
   an outer coating based on silicon carbide (SiC) at least partially covering the substrate;
   wherein:
   the outer coating is adhered to the substrate;
   the silicon carbide is mainly crystallized in alpha form (α—SiC); and
   the outer coating based on silicon carbide has a porosity between 10 and 65%, wherein the combined thickness of the substrate and coating is greater than the original thickness of the substrate.

2. The support as claimed in claim 1, wherein the coating based on silicon carbide comprises at least 90% silicon carbide.

3. The support as claimed in claim 1, wherein a thickness of the coating based on silicon carbide is greater than or equal to 500 microns.

4. The support as claimed in claim 1, wherein the carbon substrate is in the form of graphite.

5. A firing support for ceramics, comprising:
   a carbon substrate; and
   a coating consisting of silicon carbide (SiC) at least partially covering the substrate;
   wherein:
   the coating is adhered to the substrate;
   the silicon carbide is mainly crystallized in alpha form (α—SiC); and
   the coating based on silicon carbide has a porosity between 10 and 65%, wherein the combined thickness of the substrate and coating is greater than the original thickness of the substrate.

6. The support as claimed in claim 5, wherein a thickness of the coating based on silicon carbide is greater than or equal to 500 microns.

7. The support as claimed in claim 5, wherein the carbon substrate is in the form of graphite.

* * * * *